United States Patent
Mohan et al.

(10) Patent No.: US 9,160,900 B2
(45) Date of Patent: Oct. 13, 2015

(54) SYSTEMS AND METHODS FOR COMPRESSIVE LIGHT SENSING USING MULTIPLE SPATIAL LIGHT MODULATORS

(75) Inventors: Ankit Mohan, Santa Clara, CA (US); Siu-Kei Tin, Milpitas, CA (US); Eric W. Tramel, Starkville, MS (US)

(73) Assignee: Canon Kabushiki Kaisha, Tokyo (JP)

( * ) Notice: Subject to any disclaimer, the term of this patent is extended or adjusted under 35 U.S.C. 154(b) by 769 days.

(21) Appl. No.: 13/408,907

(22) Filed: Feb. 29, 2012

(65) Prior Publication Data

US 2013/0222582 A1    Aug. 29, 2013

(51) Int. Cl.
*H04N 5/232* (2006.01)
*H04N 5/225* (2006.01)

(52) U.S. Cl.
CPC ................................ *H04N 5/225* (2013.01)

(58) Field of Classification Search
CPC ....... H04N 5/00; H04N 9/00; H04N 5/23293; H04N 9/3102; H04N 5/225
See application file for complete search history.

(56) References Cited

U.S. PATENT DOCUMENTS

| | | | | |
|---|---|---|---|---|
| 5,327,370 | A * | 7/1994 | Brandstetter et al. | ......... 708/816 |
| 7,756,407 | B2 | 7/2010 | Raskar | |
| 7,965,936 | B2 | 6/2011 | Raskar | |
| 2009/0016572 | A1* | 1/2009 | Hassebrook et al. | ......... 382/106 |
| 2009/0238060 | A1* | 9/2009 | Yasuda et al. | ................. 369/103 |
| 2009/0268970 | A1 | 10/2009 | Babacan | |
| 2011/0069324 | A1 | 3/2011 | Kang | |
| 2013/0002665 | A1* | 1/2013 | Shestak et al. | ................. 345/419 |
| 2014/0240461 | A1* | 8/2014 | Russell et al. | .................. 348/46 |

OTHER PUBLICATIONS

Marc Levoy et al., Light Field Rendering, ACM SIGGRAPH, 1996.
Emmanuel J. Candès et al., Enhancing Sparsity by Reweighted L1 Minimization, J Fourier Anal Appl (2008) 14: 877-905.
Ashok Veeraraghavan et al., Dappled Photography: Mask Enhanced Cameras for Heterodyned Light Fields and Coded Aperture Refocusing, ACM SIGGRAPH 2007.
Se Baek Oh et al., Augmenting Light Field to modelWave Optics effects, Jul. 9, 2009.
Edward H. Adelson et al., Single Lens Stereo with a Plenoptic Camera, IEEE PAMI, 14(2), 1992.
Chia-Kai Liang et al., Programmable Aperture Photography: Multiplexed Light Field Acquisition, ACM SIGGRAPH 2008.
S. Derin Babacan et al., Compressive Sensing of Light Fields, IEEE ICIP 2009.
Amit Ashok et al., Compressive Light Field Imaging, SPIE 7690, 3D Visualization and Processing II, 2010.
Michael Wakin et al., An Architecture for Compressive Imaging, ICIP, 2006.
Ren Ng et al., Light Field Photography with a Hand-held Plenoptic Camera, Stanford Tech Report CTSR Feb. 2005.
T. Georgiev et al., Spatio-angular Resolution Trade-offs in Integral Photography, EGSR, 2006.

\* cited by examiner

*Primary Examiner* — Huy T Nguyen
(74) *Attorney, Agent, or Firm* — Canon U.S.A., Inc. IP Division

(57) ABSTRACT

Systems and methods for capturing light field information including spatial and angular information using an image pickup device that includes an image sensor and at least one spatial light modulator (SLM) take multiple captures of a scene using the at least one SLM to obtain coded projections of a light field of the scene, wherein each capture is taken using at least one pattern on the at least one SLM, and recover light field data using a reconstruction process on the obtained coded projections of the light field.

18 Claims, 9 Drawing Sheets

$$y = A \cdot L(s, u)$$

= Captured Data | Measurement Matrix | · Light field

FIG. 9

SYSTEMS AND METHODS FOR COMPRESSIVE LIGHT SENSING USING MULTIPLE SPATIAL LIGHT MODULATORS

BACKGROUND

1. Field

The present disclosure relates to compressive light sensing, including compressive light-field sensing.

2. Background

Several techniques have been proposed for light-field capture. Unfortunately, these techniques trade spatial resolution for angular resolution. Also, the trade-off between spatial resolution and angular resolution is determined at the time of design or manufacture.

SUMMARY

In one embodiment, a method for capturing light field information including spatial and angular information using an image pickup device that includes an image sensor and at least one spatial light modulator (SLM) comprises taking multiple captures of a scene using at least one SLM to obtain coded projections of a light field of the scene, wherein each capture is taken using at least one pattern on the at least one SLM, and recovering light field data using a reconstruction process on the obtained coded projections of the light field.

In one embodiment, a system for capturing images comprises one or more spatial light modulators, wherein each spatial light modulator is configurable into a respective pattern, a first image sensor that includes one or more pixels, and one or more processors configured to cause the system to configure the one or more spatial light modulators into respective patterns, capture coded projections of a light field from a scene using the one or more spatial light modulators and the first image sensor, and generate a representation of the light field using a reconstruction process on the captured coded projections of the light field.

In one embodiment, a system for capturing images comprises a plurality of spatial light modulators, wherein each spatial light modulator is configurable into a respective pattern, and a first image sensor that is configured to capture coded projections of a light field that has passed through the plurality of spatial light modulators, wherein the first image sensor includes one or more pixels.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 9 illustrates an embodiment of a technique for light field data recovery.

DESCRIPTION

Though the following description is of certain explanatory embodiments, the disclosure is not limited to these embodiments, but includes alternatives, equivalents, and modifications, such as are included within the scope of the claims. Additionally, the explanatory embodiments may include several novel features, and a particular feature may not be essential to practice the devices, systems, and methods described herein.

Figure 1:
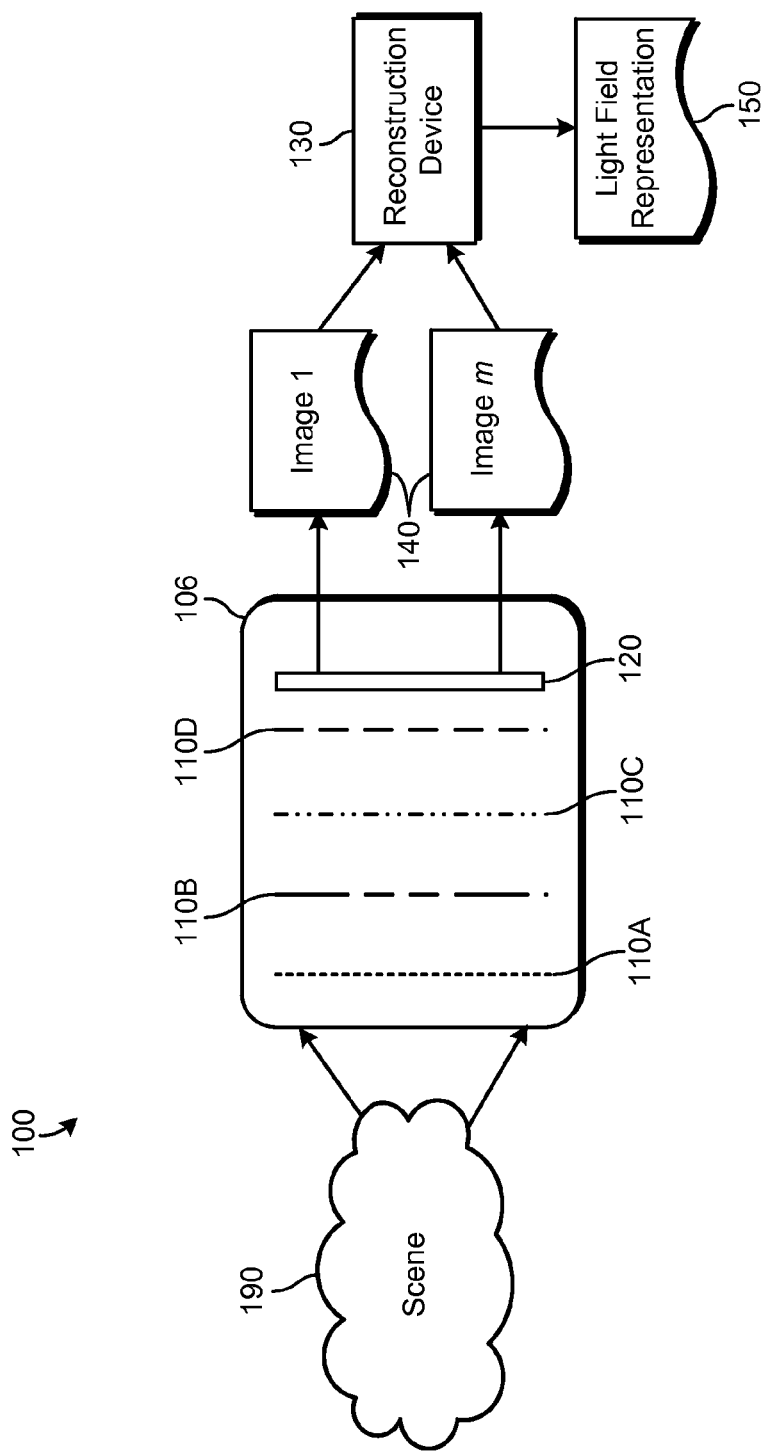
FIG. 1 is a block diagram that illustrates an example embodiment of a system for capturing light field information.

FIG. 1 is a block diagram that illustrates an example embodiment of a system 100 for capturing light field information. The system 100 includes an image pickup device 106 that captures coded projections of a light field from a scene 190. The image pickup device 106 includes an image sensor 120 that includes one or more pixels and a plurality of spatial light modulators 110A-D (a spatial light modulator is also referred to herein as an "SLM"). FIG. 1 shows the plurality of SLMs as consisting of four SLMs for illustrative purpose only; any number of SLMs may be used in different embodiments. The spatial light modulators 110A-D provide a coded modulation of the light field, and each pixel of the image sensor 120 captures a coded projection of the light field. Multiple images 140 (shown as image 1 to image m, where m is any applicable number of images) may be captured with the SLMs configured into different patterns. Each captured image 140 comprises pixels each of which may be a different coded projection of the light field, and the respective patterns on the SLMs 110A-D may be changed to encode the projections differently. The images 140 may be input to a reconstruction device 130, and the reconstruction device 130 may generate a representation of the light field 150 based on the coded projections captured in the images 140.

The light field may be a four-dimensional (4D) light field, and the image sensor 120 may be a two-dimensional sensor capable of capturing a two-dimensional array of coded projections of the light field. An SLM may modulate light, for example by altering the amplitude of a light ray (e.g., by acting as an amplitude mask), altering the phase of the light passing through it (e.g., a phase mask), or both. The transparency and/or opacity of an SLM may be controlled by a computing device, and a computing device may send signals to the SLM to configure it with a pattern that includes one or more opaque sections and one or more transparent sections. In other embodiments, a pattern may include one or more sections of varying degrees of opacity intermediate between fully opaque and fully transparent (e.g., grayscale sections). SLMs may include electrically addressed spatial light modulators and/or optically addressed spatial light modulators. A computing device may send signals (e.g., data, commands) to an SLM to cause it to configure itself with a pattern of opaque, transparent, and/or grayscale sections, and the addressing of the SLM may be used by the computing device to indicate the sections of the SLM that should be opaque, the sections that should be transparent, and/or the sections that should be grayscale. Other signals may be sent to an SLM to configure the SLM with a different pattern of transparent, grayscale, and opaque sections.

The SLMs 110A-D may implement the patterns to form respective dynamic masks (e.g., masks that may be reconfigured by a computing device with different patterns), and the plurality of SLMs 110A-D may form a plurality of dynamic masks. Other embodiments include one or more static masks (masks with fixed patterns that cannot be reconfigured by a computing device, for example SLMs that cannot be reconfigured by a computing device). However, though a static mask cannot be reconfigured by a computing device, an image pickup device 106 may contain physically changeable static masks. Additionally, some embodiments are capable of dynamic SLM spacing and adjust the distance between the SLMs 110A-D to alter the encoding of projections. Therefore, depending on the embodiment, the image pickup device 106 may include one or more SLMs 110A-D, the SLMs 110A-D may be dynamic or static, and/or a distance between any two of the SLMs 110A-D may be adjustable by the image pickup device 106 or a computing device.

The reconstruction device 130 may include one or more computing devices, for example desktop computers, laptops, servers, cell phones, smart phones, PDAs, tablet PCs, digital cameras, etc. The reconstruction device 130 includes computer-executable instructions that the reconstruction device may execute to cause it to perform operations that recover the light field data based on the images 140 in order to generate a representation of the light field 150. For example, the reconstruction device 130 may recover the light field data using sparse reconstruction, such as L-1 minimization. The light field representation 150 may include data that represents the light field (e.g., mathematical data that describes the light field) and may be stored in a computer-readable format.

Figure 2:
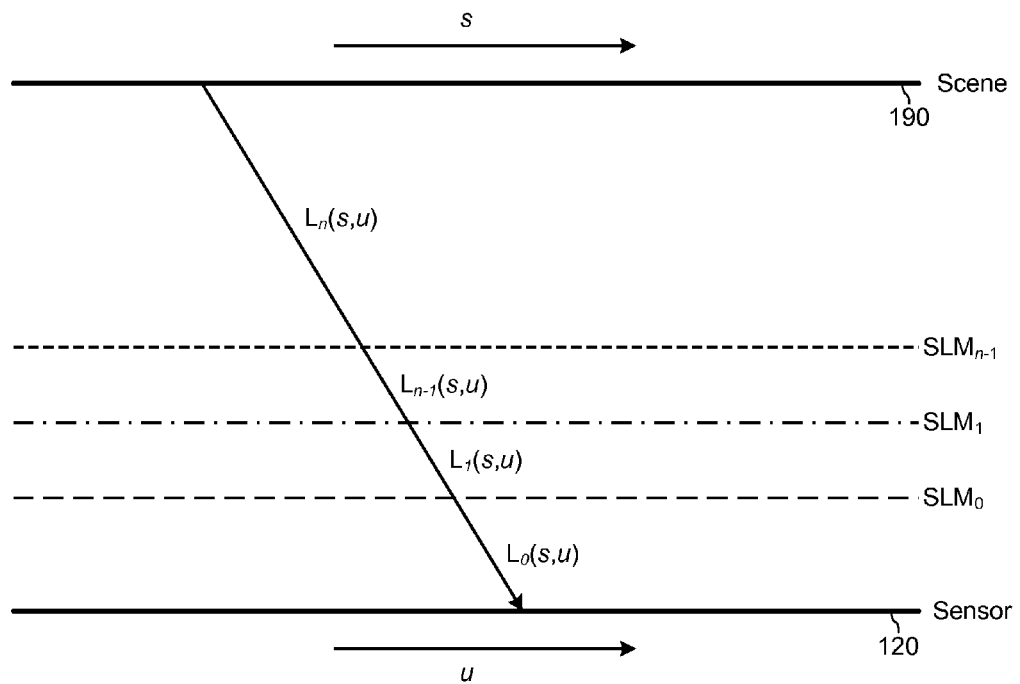
FIG. 2 illustrates an example of light being modulated by a plurality of spatial light modulators.

FIG. 2 illustrates an example of light being modulated by a plurality of spatial light modulators. FIG. 2 shows an explanatory flatland case where the light field is two-dimensional and the sensor is one-dimensional, and assumes one line (line 120, parameterized by coordinate u) is coincident with the sensor and the other line (line 190, parameterized by coordinate s) is coincident with the scene. The light field is described by a two-dimensional function parameterized as L (s, u). The light field falling on $SLM_{n-1}$ is $L_n(s, u)$. Each SLM modulates the light field, and the shield field of an SLM describes the modulation of the SLM. The modulated light field that has passed through $SLM_{n-1}$ is given by $$L_{n-1}(s,u) = L_n(s,u) \cdot S_{n-1}(s,u),$$

where $S_{n-1}(s, u)$ is the shield field of $SLM_{n-1}$. The pattern on an SLM may have the effect of performing a convolution in the frequency domain on the light that passes through the pattern on the SLM. The cumulative effect of the shield fields is given by $$L_0(s, u) = L_n(s, u) \prod_{i=0}^{n-1} S_i(s, u).$$

The sensor obtains a one-dimensional array of coded projections of the light field parameterized by u. In particular, the coded projection at location u is given by $$m(u) = \int_S L_0(s, u) ds = \int_S L_n(s, u) Q(s, u) ds,$$

where integration is taken over the whole scene S, and where $$Q(s, u) = \prod_{i=0}^{n-1} S_i(s, u).$$

In the example shown in FIG. 2, the sensor captures a one-dimensional array of coded projections of the light field in a flatland scenario. Likewise, this extends to a real-world scenario, where the image sensor 120 shown in FIG. 1 is two-dimensional and captures a two-dimensional array of coded projections, parameterized by coordinates (u, v), of the four dimensional light field from a two dimensional scene 190, parameterized by coordinates (s, t).

Each coded projection may be captured with at least one pattern on at least one SLM. In some embodiments, when a coded projection is captured every SLM has a different pattern than the respective SLM had when the previous coded projection was captured. In some embodiments, not all of the SLMs have a different pattern relative to the patterns used to capture the previous coded projection. When configured according to a random pattern, each addressable location of an SLM may have a random value chosen from the set {0,1}, where 0 denotes opaque and 1 denotes transparent, thus creating a random arrangement of sections with 0s and sections with 1s on the SLM. In other embodiments any intermediate value between 0 and 1 may also be used (e.g., varying degrees of transparency/opacity). Also, one or more of the patterns may be determined based on the particular scene being captured (e.g., portrait, night shot, landscape, sports, sky, water, high dynamic range). Furthermore, patterns may be generated based on previously collected images of the scene being captured. For example, a pattern for an SLM may be generated based on one or more previously captured coded projections of a scene. Thus, the pattern(s) may be dynamically generated as coded projections of the scene are captured.

Figure 3A:
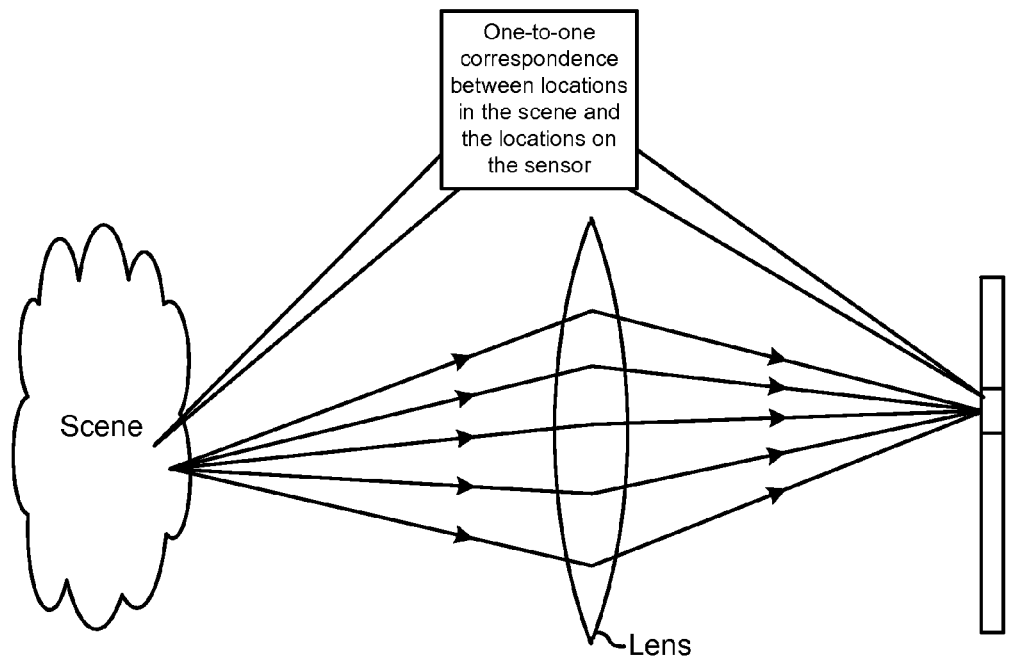
FIG. 3A illustrates an image pickup device that has a one-to-one correspondence.

Also, the image pickup device 106 may not focus the light field (e.g., with a lens) on the image sensor like a typical camera. A typical camera focuses (or attempts to focus) light from a scene onto an image sensor, and the rays of light from a location in the scene are focused onto a respective location (e.g., pixel) on the image sensor. The image sensor integrates the rays of light at the location (e.g., at a pixel on the image sensor) and generates an intensity value that indicates the result of the integration. Thus, for the plane of focus, there is a one-to-one correspondence between a location on the scene and a location on the image sensor, and a location on the image sensor detects light rays that originate from one location in the scene 190. FIG. 3A illustrates an image pickup device that has a one-to-one correspondence.

Figure 3B:
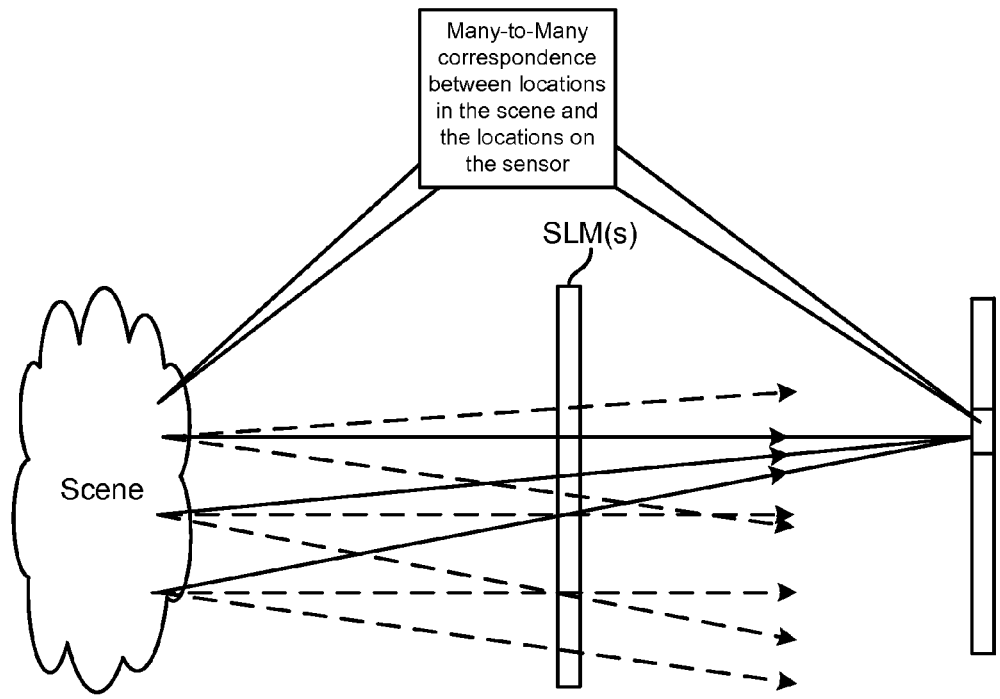
FIG. 3B illustrates an embodiment of an image pickup system that has a many-to-many correspondence.

However, the image pickup device 106 may not focus light like a typical camera. There is a many-to-many correspondence between locations in the scene 190 and locations on the image sensor 120 (e.g., a many-to-one correspondence between locations in the scene 190 and a location on the image sensor 120), so any location on the image sensor 120 may detect light rays (e.g., a coded projection of the light rays) that originated from multiple locations in the scene 190. Thus, in one image capture, the image pickup device 106 may capture as many coded projections of the light field as the number of pixels in the image sensor 120. FIG. 3B illustrates an embodiment of an image pickup system that has a many-to-many correspondence. In some embodiments, the light rays detected by a pixel in the image sensor 120 may have originated from many or all of the locations in the scene.

Thus, a particular location (e.g., pixel) on the image sensor 120 may acquire information about light rays that originated from many different points in the scene 190.

Additionally, capturing coded projections without using a lens may allow the parameters of the image pickup device 106 to be adjusted by modifying software (e.g., software settings, software updates) instead of modifying the hardware (e.g., changing lenses, changing the zoom of a lens, changing the aperture). Furthermore, compressive capture with the SLM patterns may allow for more efficient data capture. Rather than capturing more light information than is necessary and discarding the superfluous or undesired information after capture, some or all of the superfluous or undesired information may not be captured or may be discarded during capture.

Figure 4:
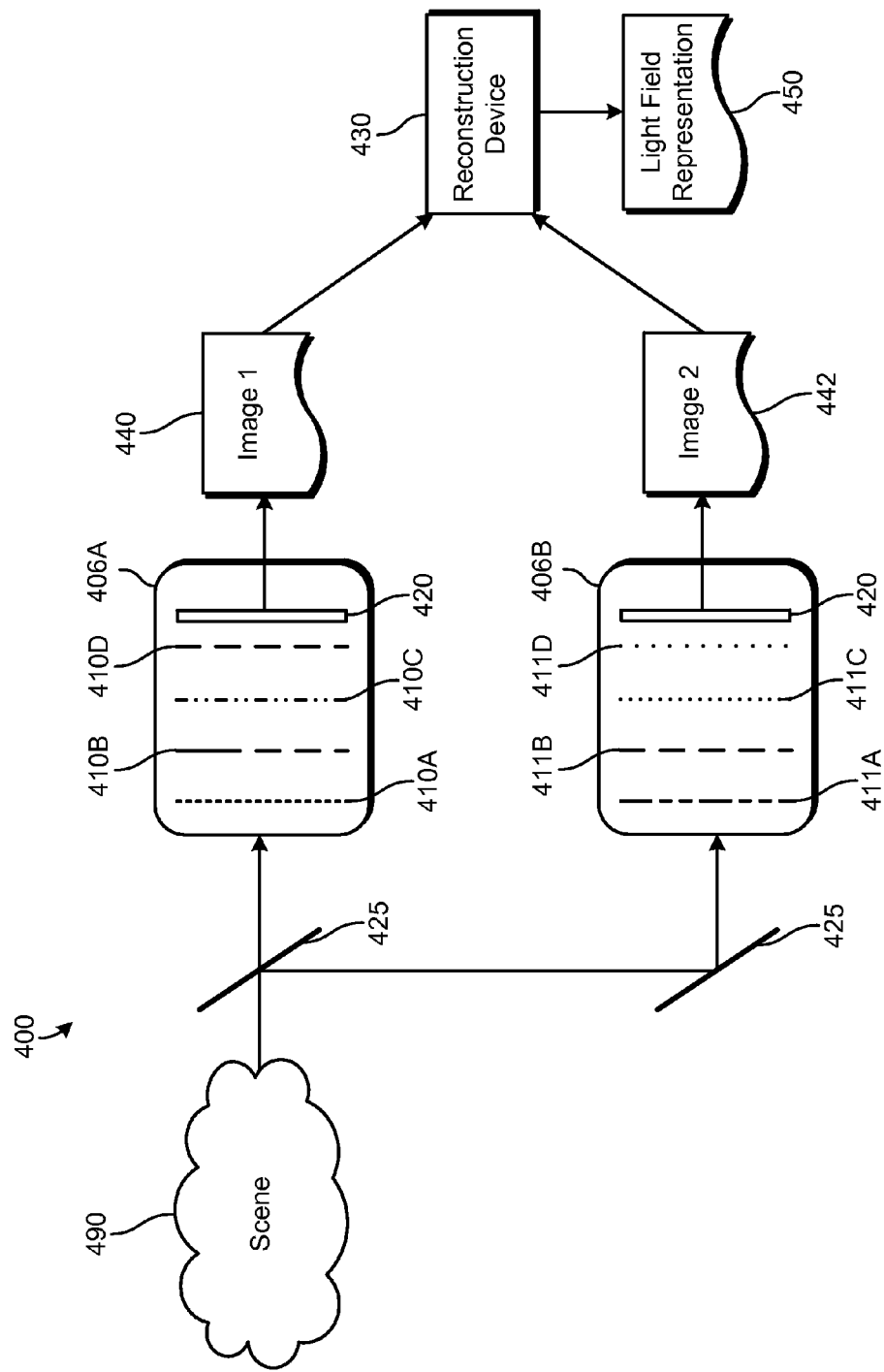
FIG. 4 is a block diagram that illustrates an example embodiment of a system for capturing light field information.

FIG. 4 is a block diagram that illustrates an example embodiment of a system 400 for capturing light field information. The system 400 includes two image pickup devices 406A-B that capture coded projections of a light field from a scene 490, though other embodiments may include more than two image pickup devices. The image pickup devices 406A-B each includes a respective image sensor 420. Also, image pickup device 406A includes a stack of SLMs, SLMs 410A-D, and image pickup device 406B includes a stack of SLMs, SLMs 411A-D. The light field from the scene 490 is directed to both image pickup devices 406A-B by redirectors 425. The redirectors 425 may include, for example, one or more mirrors and/or beam splitters. Thus, the light field from the scene 490 is split into a first light field and a second light field, wherein the first light field is detected by image pick up device 406A and the second light field is detected by image pickup device 406B. Image pickup device 406A and image pickup device 406B can capture images in parallel, for example image 1 440 and image 2 442. Also, the image pickup devices 406A-B can each capture multiple images like the image pickup device 106 shown in FIG. 1. The images, including image 1 440 and image 2 442, may be captured with the SLMs configured into different patterns. Thus, image pickup device 406A can capture image 1 440 with a different pattern on one or more of the SLMs 410A-D than the patterns on the SLMs 411A-D used to capture image 2 442 by image pickup device 406B. Thus, the image pickup devices 406A-B can simultaneously or nearly simultaneously capture coded projections of the first and second light field. The images may be input to a reconstruction device 430, and the reconstruction device 430 may generate a light field representation 450 of the original light field from scene 490 based on the images.

Figure 5:
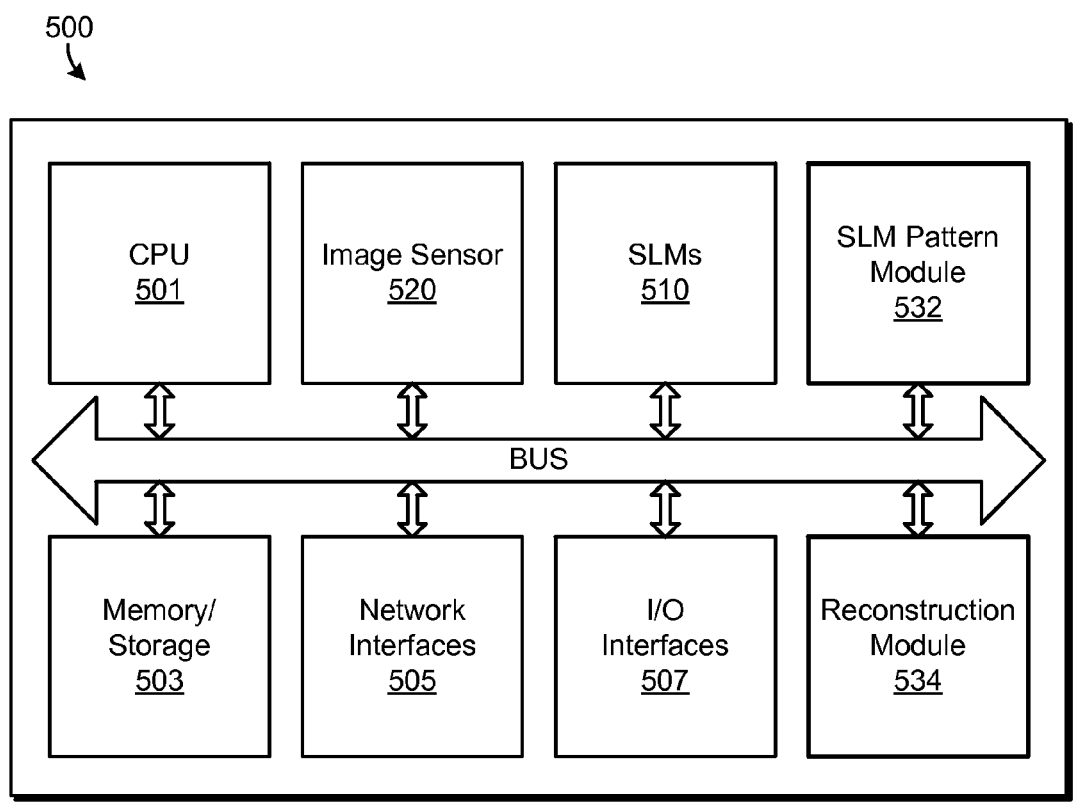
FIG. 5 is a block diagram that illustrates an example embodiment of a system for capturing light field information.

FIG. 5 is a block diagram that illustrates an example embodiment of a system 500 for capturing light field information. The system 500 includes one or more processors 501 (also referred to herein as "CPU 501"), which may be conventional or customized central processing units (e.g., microprocessor(s)). The CPU 501 is configured to read and implement computer-executable instructions, for example instructions stored in the memory/storage 503 or stored in one or more modules. Note that the computer-executable instructions may include those for the performance of various methods described herein. The CPU 501 may command and/or control other components of the system 500. The system 500 also includes I/O interfaces 507, which provide communication interfaces to input and output devices, which may include, for example, a keyboard, a display, a mouse, a printing device, a touch screen, a light pen, an optical storage device, a scanner, a microphone, a camera, a drive, etc. The network interfaces 505 also allow the system 500 to communicate with a network and other systems and devices via the network, and the network interfaces 505 may have wired and/or wireless capabilities.

The system 500 additionally includes a memory/storage 503, which includes one or more computer-readable and/or writable media. The memory/storage 503 is configured to store data and/or computer-executable instructions. Computer-readable media include, for example, a magnetic disk (e.g., a floppy disk, a hard disk), an optical disc (e.g., a CD, a DVD, a Blu-ray disc), a magneto-optical disk, a magnetic tape, semiconductor devices (e.g., a non-volatile memory card, flash memory, DRAM, SRAM, a solid state drive, an EPROM, an EEPROM), etc. The components of the system 500 are connected via a bus. Also, the system 500 includes an operating system, which manages one or more of the hardware, the processes, the applications, the interrupts, the memory, and the file system.

The system also includes an image sensor 520 and one or more SLMs 510. The SLMs 510 are configured into patterns, thus forming masks, in response to received signals, and the SLMs 510 may be dynamically reconfigured to form different masks. The system also includes an SLM pattern module 532 and a reconstruction module 534. A module includes computer-executable instructions that may be executed by one or more members of the system 500 (e.g., the CPU 501) to cause the system 500 to perform certain operations, though for purposes of description a module may be described as performing the operations. Modules may be implemented in software (e.g., JAVA, C, C++, C#, Basic, Assembly), firmware, and/or hardware. In other embodiments, the system 500 may include additional modules, the modules may be combined into fewer modules, and/or the modules may be divided into more modules. Modules may be implemented in any applicable computer-readable storage medium that can supply the computer-executable instructions. Furthermore, when the computer-executable instructions are executed, an operating system executing on the system 500 may perform at least part of the operations that implement the instructions.

The instructions in the SLM pattern module 532 may be executed to cause the system 500 to generate and/or select one or more patterns for the SLMs 510. Also, the SLM pattern module 532 may store patterns that were previously generated. The SLM pattern module 532 may generate patterns based on one or more input parameters, for example a desired trade-off between spatial data and angular data, a number of SLMs, a number of images of the scene to be captured, a number of image pickup devices, and a type of the scene (e.g., portrait, night, indoors, outdoors). Also, the SLM pattern module 532 may select one or more stored patterns based on the one or more input parameters. The patterns may be organized into arrays (e.g., a group of patterns corresponding to a number of SLMs), sequences of patterns/arrays (e.g., a sequence of patterns for successive image captures, a sequence of arrays for multiple SLMs for successive image captures), and image pickup devices (e.g., arrays and/or sequences for two or more image pickup devices operating in parallel).

The instructions in the reconstruction module 534 may be executed to cause the system 500 to recover light field data based on one or more captured coded projections of a light field.

Figure 6:
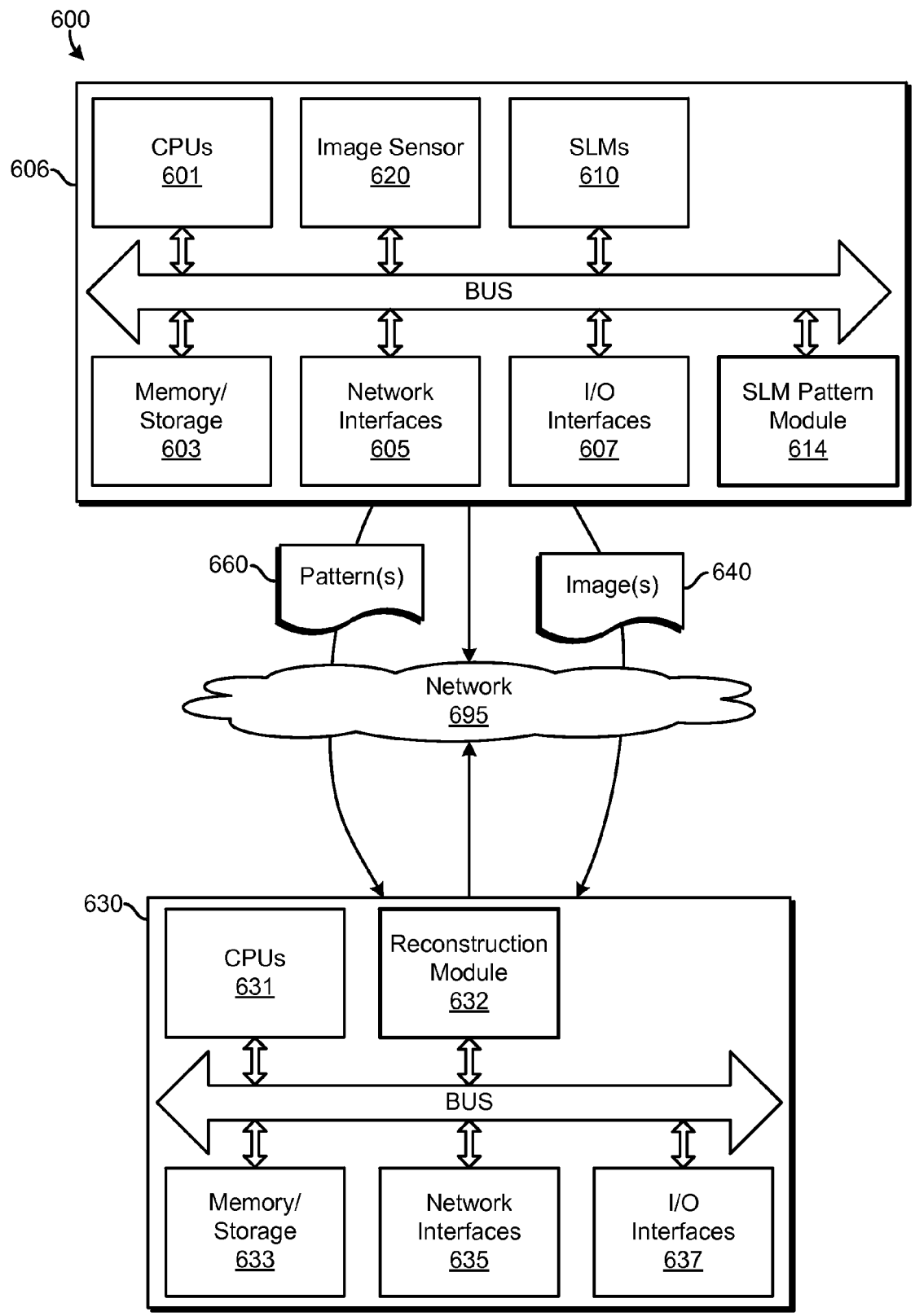
FIG. 6 is a block diagram that illustrates an example embodiment of a system for capturing light field information.

FIG. 6 is a block diagram that illustrates an example embodiment of a system 600 for capturing light field information. The system 600 includes an image pickup device 606 and a reconstruction device 630. The image pickup device 606 includes one or more CPUs 601, memory/storage 603, network interfaces 605, I/O interfaces 607, one or more image sensors 620, one or more SLMs 610, and an SLM pattern module 614. The reconstruction device 630 includes one or more CPUs 631, memory/storage 633, network interfaces 635, I/O interfaces 637, and a reconstruction module 632. The image pickup device 606 and the reconstruction device 630 may communicate via a network 695. In another embodiment, the image pickup device 606 and the reconstruction device 630 may not be connected in any way.

In the embodiment shown in FIG. 6, the image pickup device 606 generates and/or selects SLM patterns 660 by executing the SLM pattern module 614 and configures the SLMs 610 according to the generated/selected patterns. Images 640 (e.g., coded projections of a light field) are captured by the image pickup device 606 and sent to the reconstruction device 630 via the network 695 (the patterns 660 may also be sent). In another embodiment where the image pickup device 606 and the reconstruction device 630 may not be connected, images 640 may be stored in memory/storage 603 or another computer-readable medium, from which images 640 may be retrieved and provided to the reconstruction device 630 during post capture. Based on the received images, the reconstruction module 632 on the reconstruction device 630 recovers the light field data and generates a representation of the light field.

Figure 7:
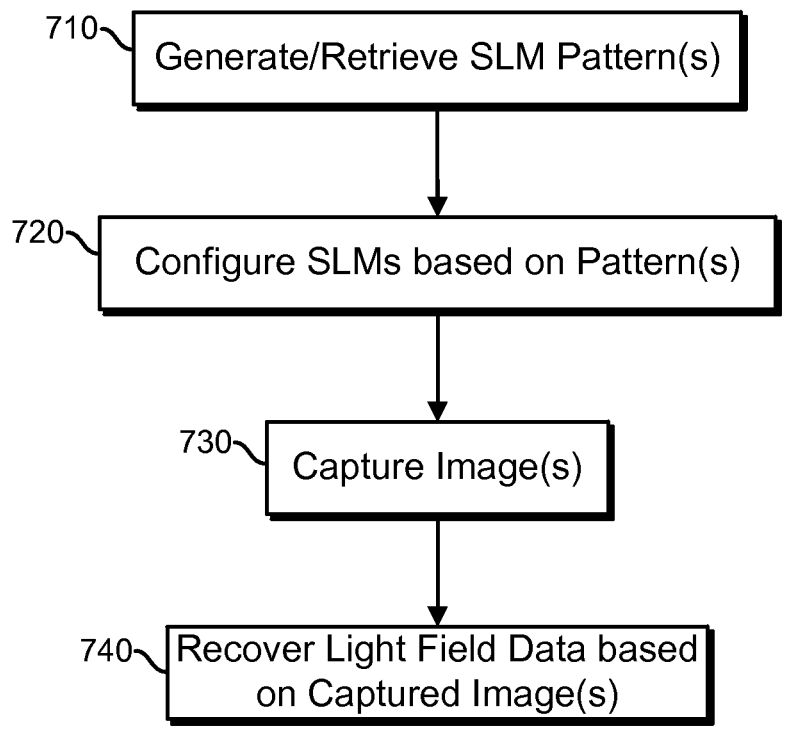
FIG. 7 is a flow diagram that illustrates an example embodiment of a method for capturing light field information.

FIG. 7 is a flow diagram that illustrates an example embodiment of a method for capturing light field information. Other embodiments of this method and the other methods described herein may omit blocks, add blocks, change the order of the blocks, combine blocks, and/or divide blocks into separate blocks. Also, the methods described herein may be implemented by the systems and devices described herein, for example the image pickup device 606 and/or the reconstruction device 630.

The flow starts in block 710, where SLM patterns are generated and/or retrieved. The patterns may indicate addresses on an SLM and a value (e.g., a degree of opaqueness, a degree of transparency) for a respective address. The patterns may already be stored on a computer-readable medium when block 710 begins, or the patterns may be dynamically generated by one or more computing devices. The patterns may be generated with the objective of optimizing L-1 reconstruction, obtaining an incoherent set of coded projections, and/or causing each pixel to capture a random coded projection of the light field. Next, flow proceeds to block 720, where one or more SLMs are configured to form masks based on the patterns. For example, a processor may send information to an SLM that indicates addresses on the SLM and the values for the respective addresses, and the SLM's opaqueness/transparency may be configured according to the received information. Flow then proceeds to block 730, where one or more images (e.g., coded projections) are captured. This block may be repeated for multiple image captures, for example when the patterns of one or more SLMs are changed. Also, in some embodiments, the spacing between two or more of the SLMs may be changed for successive image captures. Finally, in block 740, the light field data is recovered based on the captured image(s). The patterns used to capture the images and the captured images may be used as inputs in the recovery of light field data. The recovery may use light field priors and use L-1 minimization for recovery. One embodiment uses a sparsity prior for the light field.

Figure 8:
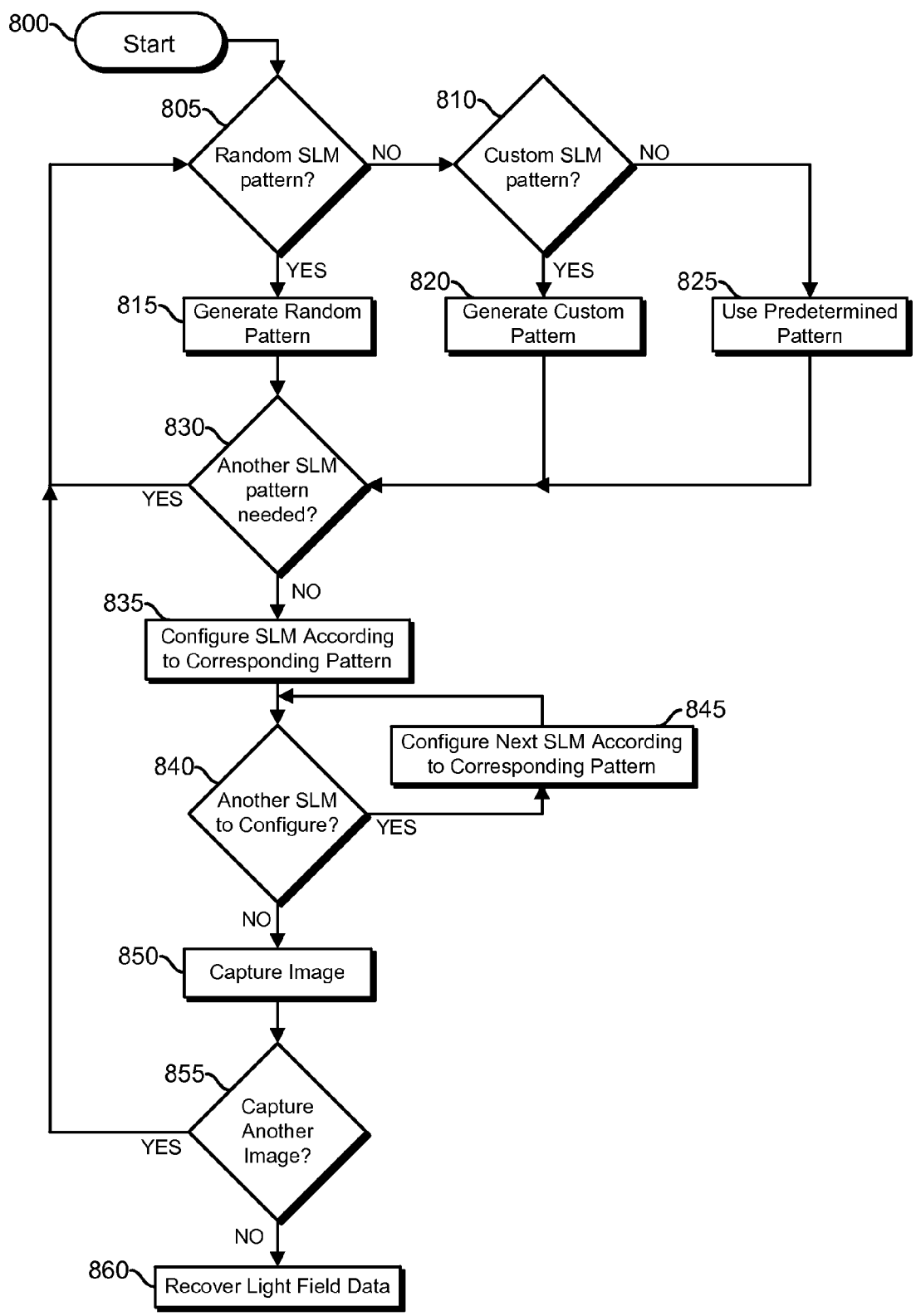
FIG. 8 is a flow diagram that illustrates an example embodiment of a method for capturing light field information.

FIG. 8 is a flow diagram that illustrates an example embodiment of a method for capturing light field information. The flow starts in block 800, for example in response to a signal received by an image pickup device (e.g., a button press, a timer expiration). The flow proceeds to block 805, where it is determined (e.g., by the image pickup device, the system for capturing light field information) if a random SLM pattern is to be used. The determination may be based upon, for example, a received user selection of the SLM pattern, a received user selection of a type of scene (e.g., sports, ocean, snow), capabilities of a computing device, etc. If a random SLM pattern is to be used, then flow proceeds to block 815, where a random pattern is generated (e.g., by the image pickup device, the system for capturing light field information, the reconstruction device). From block 815, flow proceeds to block 830. However, if in block 805 it is determined that a random SLM pattern is not to be used, then flow proceeds to block 810.

In block 810, it is determined (e.g., by the image pickup device, the system for capturing light field information, the reconstruction device) if a custom SLM pattern is to be generated. If a custom pattern is to be used, then flow proceeds to block 820, where a custom SLM pattern is generated (e.g., by the image pickup device, the system for capturing light field information, the reconstruction device). The custom pattern may be generated based on the type of scene, the capabilities of the image pickup device, previously captured images, etc., and the generated pattern is stored on a computer-readable medium. Flow then proceeds from block 820 to block 830. If in block 810 it is determined that a custom pattern is not to be generated, then flow proceeds to block 825, where a predetermined pattern (e.g., a pattern stored on a computer-readable medium) is selected. The selection of the predetermined pattern may be based on the type of scene, the capabilities of the image pickup device, previously captured images, the attributes of one or more predetermined patterns, etc. Flow then proceeds to block 830.

In block 830 it is determined (e.g., by the image pickup device, the system for capturing light field information, the reconstruction device) if another SLM pattern is to be used. For example, another pattern may be used if multiple SLMs will be used by an image pickup device to capture coded projections. Therefore, the flow may repeat blocks 805 to 830 for each SLM that will be configured with a pattern. Also, the flow may repeat blocks 805 to 830 if multiple patterns will be generated for each SLM.

If it is determined that no additional SLM patterns are needed in block 830, then flow proceeds to block 835, where an SLM is configured according to its corresponding pattern. The SLM may be configured by sending the SLM signals that indicate the pattern (e.g., addresses on the SLM and the respective value of the addresses). Next, in block 840, it is determined if another SLM is to be configured. If yes, then flow proceeds to block 845, where the next SLM is configured according to the corresponding pattern, and then flow returns to block 840. If no, then flow proceeds to block 850, where an image (e.g., coded projection) is captured (e.g., by the image pickup device, the system for capturing light field information). Next, flow proceeds to block 855, where it is determined if another image is to be captured. If yes, flow returns to block 805. If no, flow proceeds to block 860, where light field data is recovered (e.g., by the image pickup device, the system for capturing light field information, the reconstruction device) based on the captured coded projections.

In some embodiments, the respective patterns for multiple image captures may be generated before any image is captured. Also, in some embodiments blocks of the method may be performed in parallel (e.g., SLMs may be configured while patterns are being generated, images may be captured while patterns are retrieved).

FIG. 9 illustrates an embodiment of a technique for light field data recovery. Captured data, y, which may include a plurality of coded projections of a light field from captured images, is equal to the product of a measurement matrix A and the light field L(s, u). The measurement matrix A may be determined from the patterns on the SLMs used in the capture. Thus, based on the captured data y and the measurement matrix A, light field data may be recovered and a representation of the light field L(s, u) may be generated (e.g., by the image pickup device, the system for capturing light field information, the reconstruction device). More specifically, light field data may be recovered using a reconstruction process on the captured data y assuming a light field prior. In an example embodiment, light field data may be recovered using a minimum L-1 norm reconstruction algorithm, i.e., L-1 minimization, assuming sparsity as the light field prior. Mathematically, L (s, u)=argmin $\|L\|_1$ subject to y=A$\tilde{L}$, which can be solved by relatively efficient convex optimization methods. Also, during capture, the patterns for the SLMs may be generated to optimize the measurement matrix and/or the recovery of the light field data.

The above described devices, systems, and methods can be achieved by supplying one or more computer-readable media having stored thereon computer-executable instructions for realizing the above described operations to one or more computing devices that are configured to read the computer-executable instructions stored in the one or more storage media and execute them. Thus, the systems and/or devices perform the operations of the above-described embodiments when executing the computer-executable instructions read from the one or more storage media. Also, an operating system on the one or more systems and/or devices may implement the operations of the above described embodiments. Thus, the computer-executable instructions and/or the one or more storage media storing the computer-executable instructions thereon constitute an embodiment.

Any applicable computer-readable storage medium (e.g., a magnetic disk (including a floppy disk, a hard disk), an optical disc (including a CD, a DVD, a Blu-ray disc), a magneto-optical disk, a magnetic tape, and a semiconductor device (including flash memory, a nonvolatile memory card, DRAM, SRAM, a solid state drive)) can be employed as a storage medium for the computer-executable instructions. The computer-executable instructions may be written to a computer-readable storage medium provided on a function-extension board inserted into a device or on a function-extension unit connected to the device, and a CPU provided on the function-extension board or unit may implement the operations of the above-described embodiments.

This disclosure has provided a detailed description with respect to particular explanatory embodiments. The scope of the appended claims is not limited to the above-described embodiments, and various changes and modifications may be made without departing from the scope of the claims.

What is claimed is:

1. A method for capturing light field information including spatial and angular information using an image pickup device that includes an image sensor and at least one spatial light modulator (SLM), the method comprising:
taking multiple captures of a scene using at least one SLM to obtain coded projections of a light field from the scene, wherein each capture is taken using at least one pattern on the at least one SLM, and wherein the at least one SLM modulates light from the scene; and
recovering light field data using a reconstruction process on the obtained coded projections of the light field,
wherein the reconstruction process uses L-1 minimization on the obtained coded projections to recover the light field data.

2. The method according to claim 1, wherein each pattern on the at least one SLM is a random pattern.

3. The method according to claim 1, wherein each pattern on the at least one SLM is determined based on a particular scene to be captured.

4. The method according to claim 1, wherein each pattern on the at least one SLM is determined based on previously collected images of the scene being captured.

5. The method according to claim 1, wherein each pattern on the at least one SLM comprises an opaque section and a transparent section.

6. A system for capturing images, the system comprising:
one or more spatial light modulators, wherein each spatial light modulator is configurable into a respective pattern, and wherein each of the spatial light modulators is configured to modulate light from a scene;
a first image sensor that includes one or more pixels; and
one or more processors configured to cause the system to
configure the one or more spatial light modulators into respective patterns, wherein each spatial light modulator is configured into a respective random pattern,
capture coded projections of a light field from the scene using the one or more spatial light modulators and the first image sensor, wherein the respective random pattern of each spatial light modulator used to capture a coded projection is different than the respective random pattern used to capture a previous coded projection, and
generate a representation of the light field using a reconstruction process on the captured coded projections of the light field.

7. The system of claim 6, further comprising:
a redirector configured to split the light field into a first light field and a second light field; and
a second image sensor,
wherein the first light field passes through a first group of spatial light modulators of the one or more spatial light modulators to the first image sensor and the second light field passes through a second group of spatial light modulators of the one or more spatial light modulators to the second image sensor, and
wherein the one or more processors are further configured to cause the system to capture coded projections of the light field of the scene using the one or more spatial light modulators, the first image sensor, and the second image sensor.

8. The system of claim 7, wherein the one or more processors are further configured to cause the system to simultaneously capture coded projections of the first light field and coded projections of the second light field, and wherein the coded projections of the light field comprise coded projections of the first light field and coded projections of the second light field.

9. The system of claim 6, wherein the light field does not pass through a lens between the scene and the first image sensor.

10. The system of claim 6, wherein the system comprises two or more spatial light modulators,
wherein a distance between any two spatial light modulators is adjustable by the system, and
wherein the one or more processors are further configured to cause the system to adjust a distance between two spatial light modulators.

11. The system of claim 6, wherein the reconstruction process includes determining a measurement matrix based on the respective patterns of the one or more spatial light modulators used to capture the coded projections.

12. A system for capturing images, the system comprising:
a plurality of spatial light modulators, wherein each spatial light modulator is configurable into a respective pattern, and wherein each spatial light modulator is configured to modulate light from a scene;
a first image sensor that is configured to capture coded projections of a light field from the scene that has passed through the plurality of spatial light modulators, wherein the first image sensor includes one or more pixels; and
one or more processors, wherein the one or more processors are configured to generate an array of patterns corresponding to the plurality of spatial light modulators, and wherein the one or more processors are configured to generate a sequence of arrays of patterns, wherein a number of the arrays of patterns in the sequence corresponds to a number of coded projections to be captured.

13. The system of claim 12, wherein the spatial light modulators of the plurality of spatial light modulators are configured with one or more random patterns.

14. The system of claim 12, further comprising a user input device, wherein the user input device is configured to receive a user selection of one or more patterns.

15. The system of claim 12, wherein a distance between any two spatial light modulators is adjustable by the system.

16. The method according to claim 1, wherein the at least one SLM is disposed between the scene and the image sensor.

17. The system of claim 6, wherein the one or more spatial light modulators are disposed between the scene and the first image sensor.

18. The system of claim 12, wherein the plurality of spatial light modulators is disposed between the scene and the first image sensor.

* * * * *